United States Patent [19]
Inschlag

[11] Patent Number: 5,330,129
[45] Date of Patent: Jul. 19, 1994

[54] MAGNETIC TAPE APPARATUS WITH SIMPLIFIED TAPE REEL BRAKING AFTER TAPE THREAD-IN

[75] Inventor: Josef Inschlag, Kleinschlag bei Hartberg, Australia

[73] Assignee: U.S. Philips Corporation, New York, N.Y.

[21] Appl. No.: 926,578

[22] Filed: Aug. 6, 1992

[30] Foreign Application Priority Data

Aug. 16, 1991 [AU] Australia ............... A-1624/91

[51] Int. Cl.⁵ .................................... G11B 15/22
[52] U.S. Cl. ........................... 242/355.1; 360/74.1; 360/95; 242/340; 242/343
[58] Field of Search ............... 242/204, 156.2; 360/95, 360/74.1

[56] References Cited

U.S. PATENT DOCUMENTS

| | | | |
|---|---|---|---|
| 3,809,329 | 5/1974 | Jenkins | 242/204 |
| 3,918,660 | 11/1975 | Takashino | 242/204 |
| 4,337,910 | 7/1982 | Santoro | 242/204 |
| 4,449,676 | 5/1984 | Ogata et al. | 242/204 |
| 4,638,957 | 1/1987 | Graves | 242/58.6 |
| 4,988,056 | 1/1991 | Shin | 242/204 |

FOREIGN PATENT DOCUMENTS 63-000850  6/1988  Japan .

Primary Examiner—Daniel P. Stodola
Assistant Examiner—John Q. Nguyen
Attorney, Agent, or Firm—Brian J. Wieghaus

[57] ABSTRACT

An apparatus (1) constructed for at least reproducing signals from a magnetic tape (16) extending between two reel hubs (12, 13), comprises a tape-threading device (40), which is movable between a thread-out position and at least one thread-in position, a detection device (129) for detecting whether the tape-threading device (40) has reached a thread-in position, a winding-mandrel driving device (98) for driving two winding mandrels (95, 96) which cooperate with the reel hubs (12, 13), and a braking device, which is movable between a release position and a braking position, by means of which at the end of a thread-in process the winding mandrel (95) can be braked by which the magnetic tape (16) is unwound during this thread-in process. The braking device is constituted by the winding-mandrel driving device (98) set to its stationary mode, which after the tape-threading device (40) has reached a thread-in position is brought in driving engagement with the relevant winding mandrel (95) and, as a result of the inertial and friction conditions in the winding-mandrel driving device (98), brakes the winding mandrel (95) rapidly and effectively.

4 Claims, 3 Drawing Sheets

MAGNETIC TAPE APPARATUS WITH SIMPLIFIED TAPE REEL BRAKING AFTER TAPE THREAD-IN

BACKGROUND OF THE INVENTION

The invention relates to an apparatus constructed for at least reproducing signals from a magnetic tape which extends between two juxtaposed rotatable reel hubs, the apparatus comprising (i) a tape-threading device, which is movable between a thread-out position and at least one thread-in position and which in its thread-out position engages behind the magnetic tape which extends along an initial path, which tape-threading device, as it is moved from its thread-out position to a thread-in position, moves the magnetic tape out of the initial path and into an operational path, the magnetic tape being unwound from one of the two reel hubs and the other reel hub being locked against rotation, and which in said thread-in position keeps the magnetic tape in this operational path, (ii) a detection device for detecting whether the tape-threading device has reached a thread-in position, (iii) two winding mandrels which are each in driving engagement with one of the two reel hubs and which are each coaxially connected to a winding-mandrel wheel (iv) a winding-mandrel driving device which is switchable between a stationary mode and at least one drive mode and which has a drive wheel which can be brought selectively in driving engagement with one of the two winding-mandrel wheels, and (v) a braking device, which is movable between a release position and a braking position, for the winding mandrel which is in driving engagement with the reel hub from which the magnetic tape is unwound when the tape-threading device is actuated, which braking device is set to its braking position when the detection device detects that the tape-threading device has reached a thread-in position.

Such an apparatus as defined in the opening paragraph is known in many versions. For example, the Applicant has manufactured and marketed such an apparatus in the form of a video recorder under the type designation VR 6760. This known video recorder is constructed not only for reproducing but also for recording video and audio signals. In this known video recorder the braking device for braking the winding mandrel at the end of a threading process is constituted by a spring brake whose brake spring is a cantilevered blade spring which is constantly in frictional engagement with the cylindrical circumferential surface of a brake wheel which is coaxial with the winding mandrel, the desired braking action being provided by a suitable choice of the spring force of the blade spring provided as the brake spring. As a result of this construction, the braking device constantly brakes the winding mandrel which is in driving engagement with the reel hub from which the magnetic tape is unwound during threading-in, thereby exerting an additional load on the tape-threading device and constantly exerting an additional load on the magnetic tape, which is unfavourable.

Allowance is to be made for the different effects of the choice of the spring force of the brake spring in order to obtain a specific braking action. For example, the spring force chosen for the brake spring can be comparatively small, resulting in a comparatively moderate braking action during threading-in. This has the advantage that the load exerted on the tape-threading device and the magnetic tape as a result of the braking action applied to the winding mandrel is comparatively small. However, in particular when threading-in is effected with a comparatively high threading speed, which is not uncommon in order to minimise the time required for threading-in, and when consequently the reel hub from which the magnetic tape is unwound during threading-in is set into a comparatively rapid rotation and therefore has a comparatively high kinetic energy at the instant of braking, running-out of this winding mandrel owing to inadequate braking at the end of threading-in is likely to give rise to looping of the tape, which is obviously undesirable. Alternatively, the spring force selected for the brake spring may, for example, be comparatively large, resulting in comparatively strong braking during threading-in. This has the advantage that in the case of threading-in with a comparatively high threading speed the strong braking action guarantees that looping of the tape at the end of thread-in is substantially excluded, but it has the disadvantage that the tape-threading device should be comparatively rugged and that a high load is exerted on the magnetic tape during threading-in, which is obviously equally undesirable. In the known apparatus this leads to a compromise, which is neither optimum in order to minimise the load on the tape-threading device and the magnetic tape during threading-in nor in order to ensure that at the end of threading-in the reel hub from which the magnetic tape is unwound during threading-in is braked as rapidly and strongly as possible.

It is the object of the invention to preclude the above problems with an apparatus of the type defined in the opening paragraph and to provide an improved apparatus in which the construction of the tape threading device can be light and in which during threading-in the magnetic tape is loaded only gently and after threading-in, even if this is effected with a high threading speed, a rapid and reliable braking of the winding mandrel is achieved which is in driving engagement with the reel hub from which the magnetic tape is unwound during threading-in, and consequently looping of the magnetic tape is avoided with certainty.

SUMMARY OF THE INVENTION

In order to solve this problem, the invention is characterised in that the braking device is constituted by the winding-mandrel driving device set to its stationary mode, whose drive wheel, when the detection device detects that the tape-threading device has reached a thread-in position and when the winding-mandrel driving device has been set to its stationary mode, is brought in driving engagement with the winding-mandrel wheel of the winding mandrel which is in driving engagement with the reel hub from which the magnetic tape has been unwound during the prior movement of the tape-threading device from its threaded-out position into said thread-in position.

In this way it is achieved that for braking this winding mandrel after threading-in a separate braking device is not needed but the winding-mandrel driving device, which is present in any case, is employed for this purpose in that after threading-in the winding-mandrel driving device, which has been switched to its stationary mode instead of its drive mode, is brought in driving engagement with the winding-mandrel wheel via its drive wheel, a reliable and rapid braking of the winding mandrel being achieved and looping of the tape being consequently avoided as a result of the friction and inertial conditions in the winding-mandrel driving device which has been switched to its stationary mode. As the winding-mandrel driving device is not brought in driving engagement with the winding-mandrel wheel of said winding mandrel until threading-in has been completed and is not in driving engagement with the winding-mandrel wheel of this winding mandrel during a prior threading-in process it is also achieved that during threading-in the winding-mandrel driving device exerts no braking action at all on the winding mandrel of the reel hub from which the magnetic tape is unwound, so that the winding mandrel and the reel hub with which it is in driving engagement can rotate substantially freely. This is very advantageous for a rapid threading-in process and a minimal loading of the magnetic tape. Moreover, it has the advantage that during threading-in the tape threading device is only loaded to a very small extent and can therefore be of a comparatively light construction.

The invention will now be described in more detail with reference to the drawings in which an embodiment is shown partly diagrammatically by way of non-limitative example.

DESCRIPTION OF THE PREFERRED EMBODIMENTS

Figure 1:
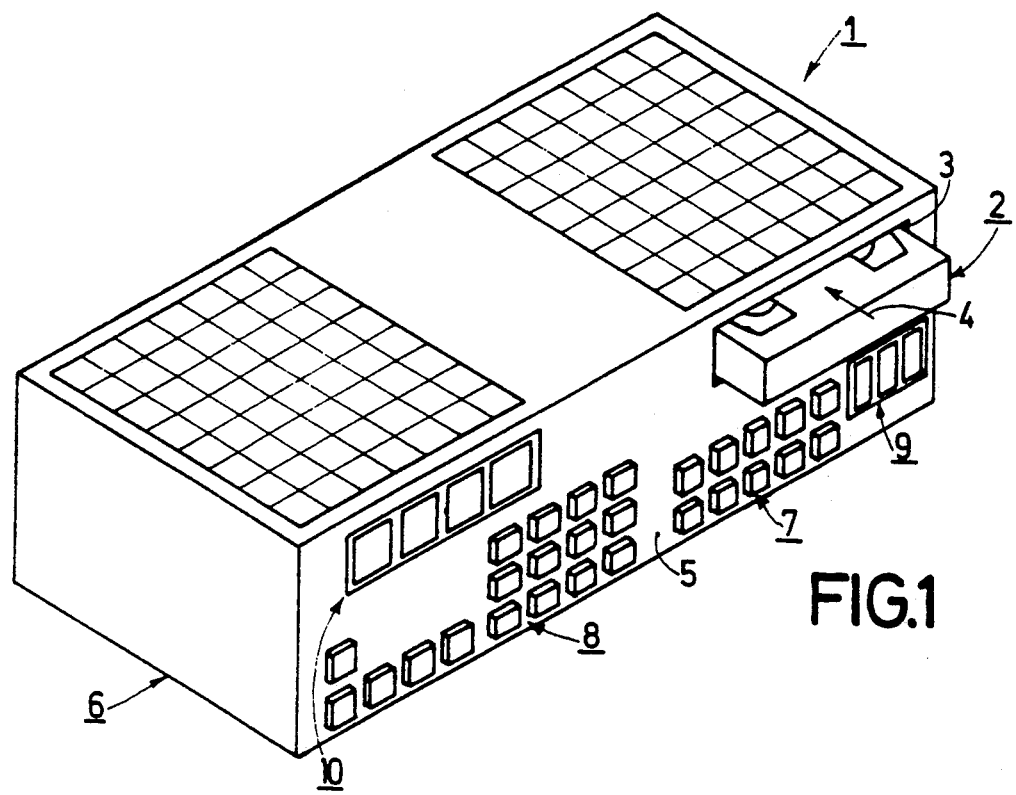
FIG. 1 is a reduced-scale diagrammatic oblique view of an apparatus for recording and reproducing television signals and audio signals, which apparatus is constructed to receive a cassette accommodating a magnetic tape which extends between two reel hubs and on/from which television signals can be recorded and reproduced in inclined tracks by means of rotatable magnetic heads.

FIG. 1 shows an apparatus 1 for recording and reproducing television signals and audio signals on a magnetic tape, which apparatus is generally briefly referred to as a video recorder. The magnetic tape is accommodated in a cassette 2 which is shown diagrammatically in FIG. 1. The cassette 2 can be inserted by hand into the apparatus 1 in the direction indicated by an arrow 4 through an opening 3, which can be closed by a cover which can be swung into the interior of the apparatus. The opening 3 is provided in a front wall 5 of the housing 6 of the apparatus 1. When the cassette 2 is loaded into the apparatus 1 it is inserted into a movable cassette holder which, after complete insertion of the cassette 2 into this apparatus, first moves the cassette parallel to the cassette main walls and then lowers it perpendicularly to the cassette main walls into an operating position inside the apparatus along an L-shaped path of movement. In this operating position the cassette 2 is positioned by means of two locating pins on the apparatus and movable tape guides of a tape threading device enter the cassette 2 to extract the magnetic tape from the cassette 2 and bring the magnetic tape into operational contact with stationary tape guides on the apparatus, stationary magnetic heads and a drum-shaped scanning device comprising rotatable magnetic heads. For starting the modes of the apparatus 1, such as "recording", "forward reproduction at normal tape speed", reproduction with stationary tape", "forward reproduction at higher tape speed" "reverse reproduction at higher tape speed", "fast forward winding", "fast reverse winding" and the like the apparatus 1 comprises a first set 7 of controls on its housing front wall 5. For programming the apparatus 1 and for entering further data, for example to set a daytime clock or setting a preprogrammed starting time, the apparatus 1 comprises a second set 8 of controls on its housing front wall 5. Moreover, at its housing front wall 5 the apparatus 1 comprises two display units 9 and 10, whose displays each comprise seven segments and which serve for example for indicating the counts of a tape-length measurement counter and for displaying the daytime.

The above-mentioned parts of the apparatus 1, such as the drum-shaped scanning device, the tape threading device and the winding-mandrel driving device, and a number of further parts of the apparatus 1 are mounted on a substantially plate-shaped chassis 11 of the apparatus 1. This chassis 11 is shown diagrammatically in FIG. 2, only the relevant parts on this chassis 11 being shown.

Figure 2:
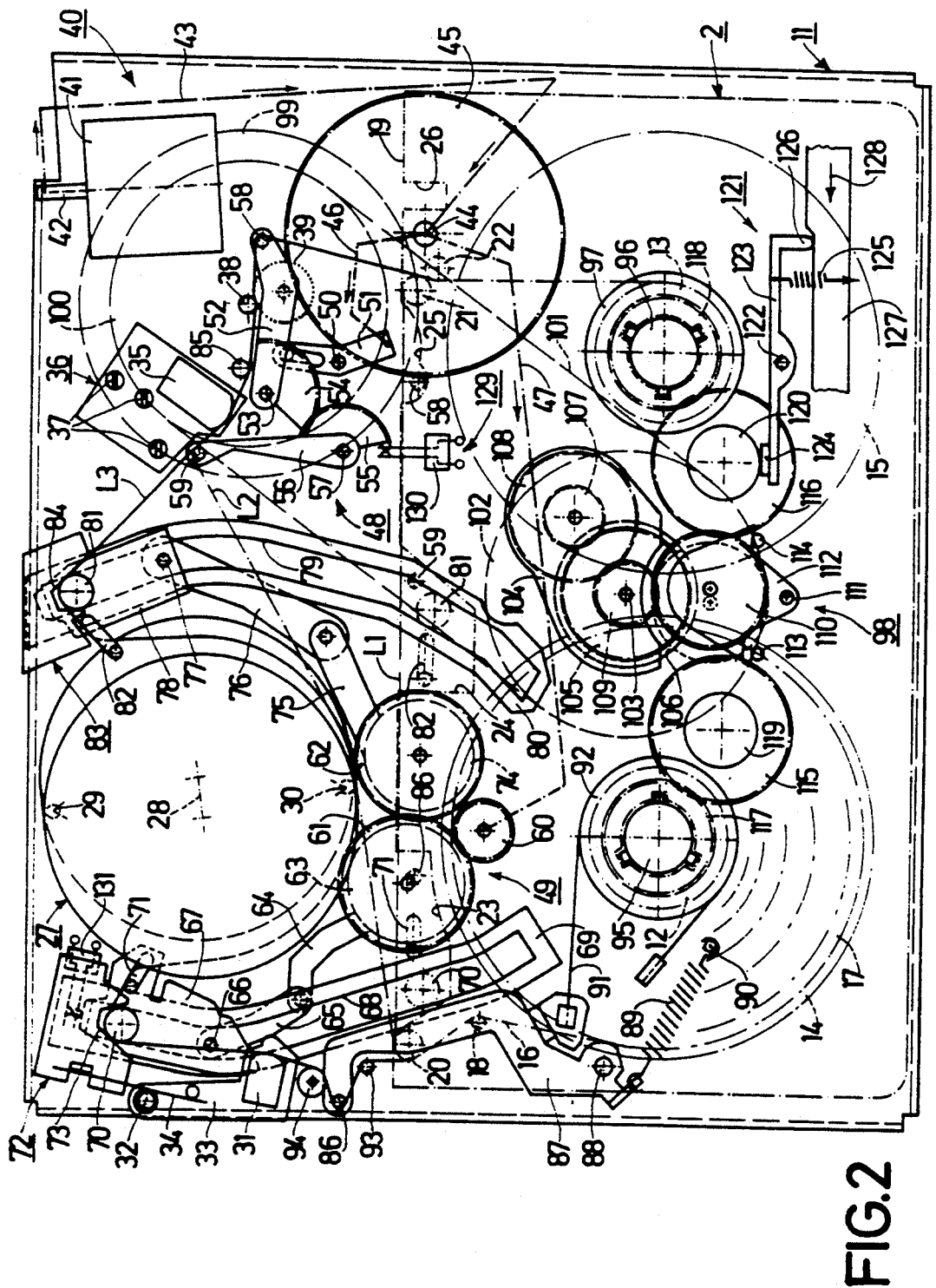
FIG. 2 shows a substantially plate-shaped chassis of the apparatus shown in FIG. 1, which chassis carries a drum-shaped scanning device, which comprises the rotatable magnetic heads, a tape threading device, by means of which the magnetic tape can be wrapped around the drum-shaped scanning device, winding mandrels for driving the reel hubs, and a winding-mandrel driving device for driving the winding mandrels.

For the sake of clarity the cassette 2, which has been lowered into its operating position, is only shown in dash-dot lines in FIG. 2. The cassette 2 accommodates two juxtaposed rotatable reel hubs 12 and 13 each having two annular flanges 14 and 15. After a cassette 2 has been inserted into the apparatus 1 the magnetic tape 16 in the cassette extends along an initial path L1, in which it extends from the first reel hub 12, i.e. from the tape spool 17 wound on this reel hub 12, to the second reel hub 13 via a first tape-guide pin 18 of the cassette, a first tape-guide roller 20 arranged on a long narrow front side 19 of the cassette, along this narrow side 19 to a second tape-guide roller 21 arranged near this narrow side 19 of the cassette, and a second tape-guide pin 22 of the cassette. At the location of its long narrow front side 19 the cassette 2 comprises a shutter, which is pivotably connected to the cassette but which is not shown in FIG. 2. The cassette 2 further has recesses 23, 24, 25 and 26 opening into the narrow front side 19 of the cassette.

The chassis 11 carries a drum-shaped scanning device 27, which in a known manner comprises a stationary lower drum section and a rotatable upper drum section, which is coaxial with the stationary lower drum section. The shaft 28 of the drum-shaped scanning device 27 is inclined relative to the plane of the chassis 11. In this way it is achieved that the magnetic heads 29 and 30 arranged on the rotatable drum section can record or reproduce television signals on/from the magnetic tape 16 in adjacent tracks which are inclined relative to the longitudinal direction of the magnetic tape 16.

Moreover, a first magnetic head 31, which is stationary in operation, is connected to the chassis 11. The magnetic head 31 is mounted on a lever 33 which is pivotable about a spindle 32. The lever 33 is loaded by a leg spring 34, which urges the lever 33 anti-clockwise as viewed in FIG. 2, the spring 34 thus tending to press the lever 33 against a stop, not shown. The magnetic head 31 serves for erasing the entire magnetic tape 16.

The chassis 11 also carries a second stationary magnetic head 35. The magnetic head 35 is secured to a diagrammatically shown plate system 36, which is secured to the chassis 11 and which comprises a series of set-screws 37 for adjusting the exact position of the magnetic head 35. The magnetic head 35 comprises two head systems, one for recording audio signals in at least one audio track which extends in the longitudinal direction of the magnetic tape 16 and the other for recording synchronisation signals or index signals in a control track which also extends in the longitudinal direction of the magnetic tape 16. By scanning said index signals a "search" mode is possible for rapidly and accurately locating specific parts of the magnetic tape 16 in a simple manner.

The chassis 11 also rotatably supports a capstan 38. For the cooperation with the capstan 38 the apparatus comprises a pressure roller 39, which in FIG. 2 is shown only diagrammatically as a dotted line. From a reset position, in which it is situated axially above the level of the magnetic tape 16 away from the chassis 11, the pressure roller 39 is first movable in its axial direction towards the chassis 11 and subsequently it is pivotable into an operating position in a direction parallel to the chassis 11 towards the capstan 38. For simplicity, the bearing construction of the pressure roller 39 is not shown in FIG. 2, because this is not relevant in the present context and such constructions are known from existing video recorders.

The apparatus 1 comprises a tape threading device 40 for extracting the magnetic tape, which is in its initial path L1 after insertion of a cassette 2, from the cassette 2 and to bring and keep it into operational contact either with only the second magnetic head 35 and the capstan 38 or with the second magnetic head 35 and the capstan 38 as well as the first magnetic head 31 and the scanning device 27.

The tape threading device 40 is movable into two thread-in positions from a thread-out position, in which it engages behind the magnetic tape 16 in its initial path L1. During such a movement, which is referred to as threading-in, the magnetic tape 16 is moved from its initial path L1 into one of two operational paths L2 and L3, which will be described in detail hereinafter.

The tape threading device 40 comprises a motor 41, hereinafter referred to as threading motor. The threading motor 41 can drive a rotatably drivable command disc 45, which is rotatable about an axis 44, via the motor shaft 42 and via a drive mechanism 43 represented as a dash-dot line. The command disc 45 is shown only diagrammatically in FIG. 2. It comprises a plurality of control grooves, projections, stops and the like. By means of the command disc 45 two threading mechanisms 48 and 49 of the tape threading device 40 can be driven via two independent separate drive connections 46 and 47, shown diagrammatically as dash-dot lines in FIG. 2.

The first threading mechanism 48 comprises a two-arm actuating lever 51, which is pivotable about an axis 50, which is movable by means of the command disc 45 via the first drive connection 46 and which is coupled to a first thread-in lever 52 via a pin-slot joint. The first thread-in lever 52 is pivotable about an axis 53 and has a first toothed segment 54. This toothed segment 54 is in mesh with a second toothed segment 55 provided on a second thread-in lever 56, which is pivotable about an axis 57. At its free end the first thread-in lever 52 carries a tape-guide pin 58. At its free end the second thread-in lever carries a further tape-guide pin 59.

The second threading mechanism 49, which can be driven by means of the command disc 45 via the second drive connection 47, comprises a first toothed drive wheel 60 which is rotatably supported on the chassis 11 and which can be driven via the second drive connection 47. The first toothed drive wheel 60 is in mesh with a second toothed drive wheel 61, which is rotatably supported on the chassis 11 and which meshes with a third toothed drive wheel 62, which is rotatably supported on the chassis 11. A first actuating disc 63, which is coaxial with the second toothed drive wheel 61, can be driven by the second toothed drive wheel 61 via a force-transmitting tension spring, not shown, which is held in a coaxial position relative to the second toothed drive wheel 61. A first actuating arm 64 projects laterally from the first actuating disc 63 and is pivotally connected to a first intermediate lever 65. The first intermediate lever 65 is pivotally connected to a first tape-guide support 67 by means of a pivot 66. The first tape-guide support 67 is guided so as to be movable along a first guide slot 68. The first guide slot 68 is formed in a strip-shaped first guide member 69 connected to the chassis 11. The first tape-guide support 67 carries a tape-guide roller 70, which extends perpendicularly to the chassis 11, and a tape-guide pin 71, which is inclined relative to the chassis 11. For positioning the first tape-guide support 67, i.e. the two tape guides 70 and 71 carried by this support, there is provided a positioning device 72, which is connected to the chassis 11 and which has a substantially V-shaped positioning recess 73 and further positioning means, not shown in FIG. 2.

A second actuating disc 74, which is coaxial with the third toothed drive wheel 62, can be driven by the third toothed drive wheel 62 of the second threading mechanism 49 via a force-transmitting tension spring, not shown, which is held in a coaxial position relative to the third toothed drive wheel 62. A second actuating arm 74 projects laterally from the second actuating disc 74 and is pivotally connected to a second intermediate lever 76. The second intermediate lever 76 is pivotally connected to a second tape-guide support 78 by means of a pivot 77. The second tape-guide support 78 is guided so as to be movable along a second guide slot 79. The second guide slot 79 is formed in a strip-shaped second guide member 80 connected to the chassis 11. The second tape-guide support 78 carries a tape-guide roller 81, which extends perpendicularly to the chassis 11, and a tape-guide pin 82, which is inclined relative to the chassis 11. For positioning the second tape-guide support 78, i.e. the two tape guides 81 and 82 carried by this support, there is provided a positioning device 83, which is connected to the chassis 11 and which has a substantially V-shaped positioning recess 84 and further positioning means, not shown in FIG. 2.

As already stated, the tape threading device 40 is movable between a thread-out position and two different thread-in positions. In its thread-out position tape threading device 40 engages behind the magnetic tape 16 in its initial path L1, as shown in dash-dot lines in FIG. 2. The tape-guide roller 70 and the tape-guide pin 71 are then disposed in the cassette recess 23, the tape-guide roller 81 and the tape-guide pin 82 as well as the further tape-guide pin 59 in the cassette recess 24, and the tape-guide pin 58 of the tape threading device 40 in the cassette recess 25.

Starting from this thread-out position, the threading motor 41 drives the control disc 45 anti-clockwise in order to perform a threading-in operation. This rotation of the control disc 45 first results in the actuating lever 51 being pivoted clockwise out of an initial position, not shown, in which its arm which is coupled to the first thread-in lever 52 via the pin-slot joint is situated nearer the cassette 2. This clockwise rotation of the actuating lever 51 causes the first thread-in lever 52 to be pivoted anti-clockwise, as a result of which the second thread-in lever 56 is pivoted clockwise via the first toothed segment 54 and the second toothed segment 55. After this pivotal movement of the first thread-in lever 52 and the second thread-in lever 56 the two thread-in levers 52 and 56 and the tape-guide pins 58 and 59 carried by them occupy the positions shown in solid lines in FIG. 2, which positions correspond to the first thread-in position of the tape threading device 40, in which the magnetic tape 16 extends along a first operational path L2.

In this operational path L2 the magnetic tape 16 extends from the first tape-guide roller 20 of the cassette to the tape-guide pin 59 while slightly in contact with the scanning device 27, and from said pin to the second tape-guide roller 21 of the cassette via the second magnetic head 35, a stationary tape-guide pin 85 connected to the chassis 11, the capstan 38, the pressure roller 39 and finally the tape-guide pin 58. In the first operational path L2 the magnetic tape 16 is thus held in scanning contact with the second magnetic head 35, so that index signals recorded on the magnetic tape 16 can be reproduced by means of the magnetic head 35 to locate a specific position on the magnetic tape 16. When the threading motor 41 stops after the first thread-in position has been reached the two tape guides 58 and 59 are both in the positions shown in FIG. 2, the tape guides 70, 71, 81 and 82 still being in their positions in the cassette recesses 23 and 24 corresponding to the thread-out position.

If the threading motor 41 is not switched off after the tape threading device 40 has reached the first thread-in position but remains switched on the first threading mechanism 48 is not moved and subsequently the second threading mechanism 49 is driven by the control disc 45 via the second drive connection 47. The first toothed drive wheel 60 is then driven anti-clockwise, causing the second toothed drive wheel 61 and hence, via the tension spring, the first actuating disc 63 to be driven clockwise and the third toothed drive wheel 62 and hence, via the other tension spring, the second actuating disc 74 to be driven anti-clockwise. As a result of this, the two tape-guide supports 67 and 78 are moved, via the two actuating arms 64 and 75 and the two intermediate levers 65 and 76, out of their initial positions, which are not shown in FIG. 2, along the guide slots 68 and 79, into their operating positions which are shown in solid lines in FIG. 2 and which correspond to the second thread-in position of the tape-threading device 40. Thus, in this second thread-in position of the tape-threading position 40 not only the two tape-guide pins 58 and 59 of the first threading mechanism 48 but also the tape-guide rollers 70 and 81 and tape-guide pins 71 and 83 of the second tape-threading mechanism 49 are in their operating positions, the magnetic tape 16 extending along a second operational path L3.

In this second operational path L3 the magnetic tape 16 is in scanning contact both with the first magnetic head 31 and the scanning device 27, i.e. the rotatable magnetic heads 29 and 30 of this device, so that video signals can be recorded in or reproduced from the inclined tracks on the magnetic tape 16 and, if desired, the magnetic tape 16 can be erased, the tape also being in scanning contact with the second magnetic head 35 for the recording and reproduction of audio signals and index signals.

When the tape-threading device 40 is in its thread-out position a tape-tension sensing pin 86 also engages the cassette recess 23. When the tape-threading device 40 is set from its thread-out position to its second thread-in position the tape-tension sensing pin 86 is also moved into its operating position shown in solid lines in FIG. 2. The tape-tension sensing pin 86 is secured to the free end of a tape-tension lever 87, which is pivotable about an axis 88 and which is engaged by a tension spring 89, which is attached to a pin 90 projecting from the chassis 11. A brake band 91 is attached to the tape-tension lever 87 and surrounds a braking disc 92, its other end being coupled to the chassis 11. In principle, the movement of the tape-tension lever 87, in order to bring the tape-tension sensing pin 86 into its operating position, is provided by the force of the tension spring 89, this movement being partly controlled by the first tape-guide support 67, but this is not relevant here.

When the tape-threading device 40 is in its second thread-in position the magnetic tape 16 extends along a second operational path L3. In this operational path L3, of which position L3 only the central line is shown in FIG. 2, the magnetic tape 16 extends from the first tape-guide roller 20 of the cassette to the second tape-guide roller 21 of the cassette via a stationary tape-guide pin 93 connected to the chassis 11, the tape-tension sensing pin 86, a tape-guide roller 94, which is rotatably supported on the chassis 11, the first magnetic head 31, the tape-guide roller 70, the tape-guide pin 71, the drum-shaped scanning device 27, the tape-guide pin 82, the tape-guide roller 81, the further tape-guide pin 59, the second magnetic head 35, the stationary tape-guide pin 85, the capstan 38 and the pressure roller 39, and finally the tape-guide pin 58.

Each of the two reel hubs 12 and 13 of a cassette 2 is in driving engagement with a respective winding mandrel 95 or 96. The first winding mandrel 95 is integral with the braking disc 92 which is surrounded by the brake band 91. For the sake of simplicity the second winding mandrel 96 is of the same construction, i.e. it is also provided with a disc 97, but this disc has no function.

For driving the two winding mandrels 95 and 96 there is provided a winding-mandrel driving device 98, which is switchable between a stationary mode and two drive modes. The winding-mandrel driving device 98 comprises a motor 99, which in the present apparatus also constitutes the drive motor for the capstan 38. The motor 99 is coaxial with the capstan 38 and is formed by a disc-shaped collectorless d.c. motor. A first pulley 100 is connected to the rotor of the motor 99 to drive a second pulley 102 via a belt 101. The second pulley 102 is rotatable about a stationary spindle 103 of a transmission casing 104 connected to the chassis 11. A first toothed transmission wheel 105 is coaxial with and locked in rotation to the second pulley 102 and extends through an opening 106 in the chassis 11. The first toothed transmission wheel 105 meshes with a second toothed transmission wheel 107. The second toothed transmission wheel 107 can drive a third toothed transmission wheel 108, which is coaxial with said second toothed transmission wheel 107, via a friction coupling, not shown. The third toothed transmission wheel 108 is in mesh with a fourth toothed transmission wheel 109, which is rotatable about the stationary spindle 105. The fourth toothed transmission wheel 109 can drive a toothed drive wheel 110, which is rotatably supported on a toothed-wheel support 112 which is pivotable about a spindle 111. In order to limit the pivotal movement of the toothed-wheel support 112 there are provided two stop pins 113 and 114 which project from the chassis 11. The toothed drive wheel 110 can be made to mesh selectively with one of two intermediate toothed wheels 115 and 116, which are rotatably supported on the chassis 11. The first intermediate toothed wheel 115 is constantly in mesh with a first winding-mandrel wheel 117, which is constructed as a toothed wheel and which is coaxially locked in rotation to the first winding mandrel 95. The second intermediate toothed wheel 116 is constantly in mesh with a second winding-mandrel wheel 118, which is constructed as a toothed wheel and which is coaxially locked in rotation to the second winding mandrel 96. Thus, the drive wheel 110 can be brought selectively in driving engagement with one of the two winding-mandrel wheels 117 and 118 via the two intermediate wheels 115 and 116.

When the motor 99 drives the pulley 100 anti-clockwise the fourth toothed transmission wheel 109 is also driven in the anti-clockwise direction, which brings the toothed drive wheel 110 in driving engagement with the second intermediate wheel 116 and thus with the second winding-mandrel wheel 118 because the toothed-wheel support 112 is pivoted clockwise. When the motor 99 drives the first pulley 100 in the clockwise direction the fourth toothed transmission wheel 109 is also driven in the clockwise direction, which brings the toothed drive wheel 110 in driving engagement with the first winding-mandrel wheel 117 via the first intermediate toothed wheel 115. The pitch diameters of the drive wheel 110 and the intermediate toothed wheels 115 and 116 are selected in such a manner that when the drive wheel 110 is pivoted from one intermediate wheel to the other the teeth of the drive wheel 110 briefly mesh with the teeth of both intermediate toothed wheels 115 and 116, which is advantageous for a very reliable pivotal movement of the drive wheel 110.

As can be seen in FIG. 2, each of the two intermediate wheels 115 and 116 is connected to a coaxial cylindrical member 119 and 120 respectively. The cylindrical member 120 of the second intermediate wheel 116 is adapted to cooperate with a shoe brake 121, which is shown highly diagrammatically. The brake 121 comprises a brake lever 123 which is pivotable about an axis 122 and which carries the brake shoe 124 provided for cooperation with the member 120, a brake spring 125 acting upon the brake lever 123 to urge it against a control slide 127 with its bevelled end 126. By moving the control slide 127 out of the position shown in FIG. 2 in the direction indicated by the arrow 128 the brake 121 is movable to release the member 120.

During a thread-in process the shoe brake 121 remains applied, so that via the member 120 the second intermediate wheel 116 and hence the second winding-mandrel wheel 118 and the second winding mandrel 96, which is coaxially connected thereto, are locked against rotation. Thus, during a thread-in process the magnetic tape 16 is unwound exclusively from the reel hub 12 which is in driving engagement with the first winding mandrel 95.

The apparatus 1 further comprises a detection device 129 for detecting whether the tape-threading device 40 has reached a thread-in position. In the present apparatus the detection device 129 comprises two separate detectors 130 and 131, constructed as microswitches, which are shown diagrammatically and which are each associated with one of the two thread-in positions of the tape-threading device 40. The microswitch 130 can be actuated by the second toothed segment 55 of the second thread-in lever 56. The microswitch 130 is actuated when the second thread-in lever 56 has reached its end position shown in FIG. 2, the tape-threading device 40 then occupying its first thread-in position, in which the magnetic tape 16 extends along its first operational path L2. The microswitch 131 can be actuated by the first tape-guide support 67. The microswitch 131 is actuated by the first tape-guide support 67 when the first tape-guide support 67 has been pressed wholly into the first positioning device 72, i.e. when the tape-threading device 40 occupies its second thread-in position, in which the magnetic tape 16 extends along its second operational path L3. The second microswitch may also cooperate with the second tape-guide support 67.

Instead of a detection device with two separate detectors a detection device comprising only one detector may be used for detecting whether the two thread-in positions have been reached. For example, the mechanism for driving the command disc may include a tachogenerator which, when the threading motor is switched on starting from an initial position, supplies tacho-pulses, which are counted by a counter of a detection device, a comparator of the detection device comparing the instantaneous count of the counter with two reference values corresponding to the two thread-in positions and in the case of agreement of the count and the reference value supplying a detection signal which indicates that the corresponding thread-in position is reached.

Figure 3:
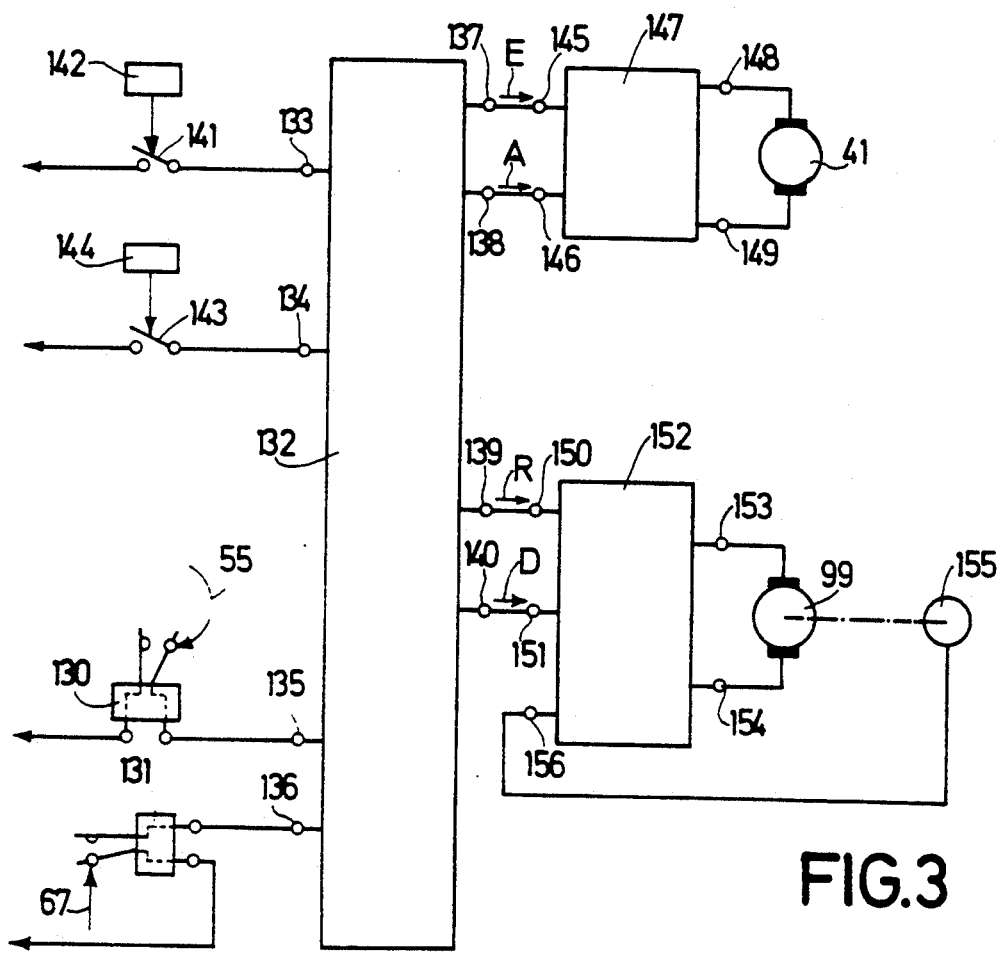
FIG. 3 shows diagrammatically a circuit arrangement of the apparatus shown in FIG. 1 for controlling the motors of the tape-threading device and the winding-mandrel driving device and comprising a microcomputer.

A circuit arrangement of the apparatus 1 shown in FIG. 1 will now be described with reference to FIG. 3. This circuit arrangement comprises a microcomputer 132. FIG. 3 shows four inputs 133, 134, 135 and 136 as well as four outputs 137, 138, 139 and 140 of the microcomputer 132. The input 133 is connected to a switch 141, which can be actuated by a button 142 of the set of controls 7 of the apparatus 1. The button 142 serves for starting a "search" mode, in which by scanning and processing index signals recorded on the magnetic tape 16 a specific tape position can be located simply and rapidly. The input 134 of the microcomputer 132 is connected to a switch 143, which can be actuated by a button 144 of the set of controls 7 of the apparatus 1. By means of the button 144 the mode "forward reproduction with normal tape speed" can be started. The input 135 of the microcomputer 132 is connected to the first microswitch 130, which can be actuated by the second toothed segment 55, as is indicated by a corresponding arrow in FIG. 3. The input 136 of the microcomputer 132 is connected to the microswitch 131, which can be actuated by the first tape-guide support 67, as is also indicated by an arrow in FIG. 3. The two outputs 137 and 138 are connected to the inputs 145 and 146 of a control circuit 147 whose outputs 148 and 149 are connected to the threading motor 41. By means of the control circuit 147 the polarity of the supply voltage to the threading motor 41 can be reversed to enable the threading motor 41 to be driven simply in different directions of rotation. An example of such a control circuit is known from U.S. Pat. No. 4,686,591. The microcomputer 132 produces a control signal E on its output 137 and during the presence of this signal the threading motor 41 is driven in the direction of rotation for which the tape-threading device 40 is moved from its thread-out position towards its thread-in positions. On its output 138 the microcomputer 132 produces a control signal A during whose presence the threading motor 41 is driven in the direction of rotation for which the tape-threading device 40 is moved from a thread-in position towards the thread-out position.

The two outputs 139 and 140 of the microcomputer 132 are connected to two inputs 150 and 151 of a control circuit 152 for the collectorless d.c. motor 99. The motor 99 is connected to two outputs 153 and 154 of this control circuit 152. The motor 99 is coupled to a tacho-generator 155 which supplies a tacho-signal to a further input 156 of the control circuit 152, which signal is representative of the actual speed of the motor 99. The motor is, for example, a motor which is commercially available from the Sony Corporation under the type designation U-26H and the control circuit 152 is, for example, an integrated circuit which is also commercially available from the Sony Corporation under the type designation CXA-8005AS. On its output 139 the microcomputer 132 supplies a control signal R which is switchable between a low level L and a high level H to define the direction of rotation of the motor 99. On its output 140 the microcomputer 132 produces a pulse-width modulated signal D to define the desired speed of the motor 99.

As stated hereinbefore, the tape-threading device 40 can be moved from its thread-out position to one of two thread-in positions, during which thread-in process the magnetic tape 16 is unwound exclusively from the reel hub 12 and the reel hub 13 is locked against rotation by the braking action of the brake 121. After a desired thread-in position has been reached the reel hub 12 should be braked to preclude running-out of the tape spool 17 on this reel hub 12. Such running-out would lead to looping of the tape, which could give rise to malfunctioning and should therefore be precluded. Therefore, to brake the first winding mandrel 95, which is in driving engagement with the reel hub 12, there is provided a braking device which is movable between a release position and a braking position and which is set to its braking position when the detection device 129 has detected that the tape-threading device has reached a thread-in position.

In a very simple and advantageous manner the braking device for the first winding mandrel 95 in the present apparatus 1 is constituted by the winding-mandrel driving device 98 switched to its stationary mode. When the detection device 129 detects that the tape-threading device 40 has reached a thread-in position and when the winding-mandrel driving device 98 has been switched to its stationary mode the drive wheel 110 of the winding-mandrel driving device 98 is brought in driving engagement with the first winding-mandrel wheel 117 of the first winding mandrel 95, which is effected by bringing the drive wheel 110 in mesh with the first intermediate wheel 115, as is indicated by a broken line in FIG. 2.

In this way it is achieved that for braking the first winding mandrel 95 after a thread-in process no separate braking device is needed but that for this purpose the winding-mandrel driving device 98, which is present in any case, is used, which is then briefly switched to its second drive mode, its drive wheel 110 being brought in driving engagement with the first winding mandrel 95 via the first intermediate wheel 115, and after the drive wheel 110 has meshed with the first intermediate wheel 115 being switched immediately to its stationary mode, after which as a result of the friction and inertial conditions inside the winding-mandrel driving device 98 in its stationary mode the first winding mandrel 95 and the reel hub 12 coupled thereto and the tape spool 17 are braked reliably and rapidly, thereby precluding looping of the tape as a result of undesirable running-out of the tape spool 17. During a thread-in process the drive wheel 110 is in mesh with the second intermediate wheel 116 and the tape-tension sensing lever 87 is not yet in its operating position, so that the brake band 91 does not brake the braking disc 92. This has the advantage that during a thread-in process substantially no braking forces are exerted on the first winding mandrel 95 so that during a thread-in process only a very small load is exerted on the magnetic tape 16 which is positioned by means of the tape-threading device 40.

Figure 4:
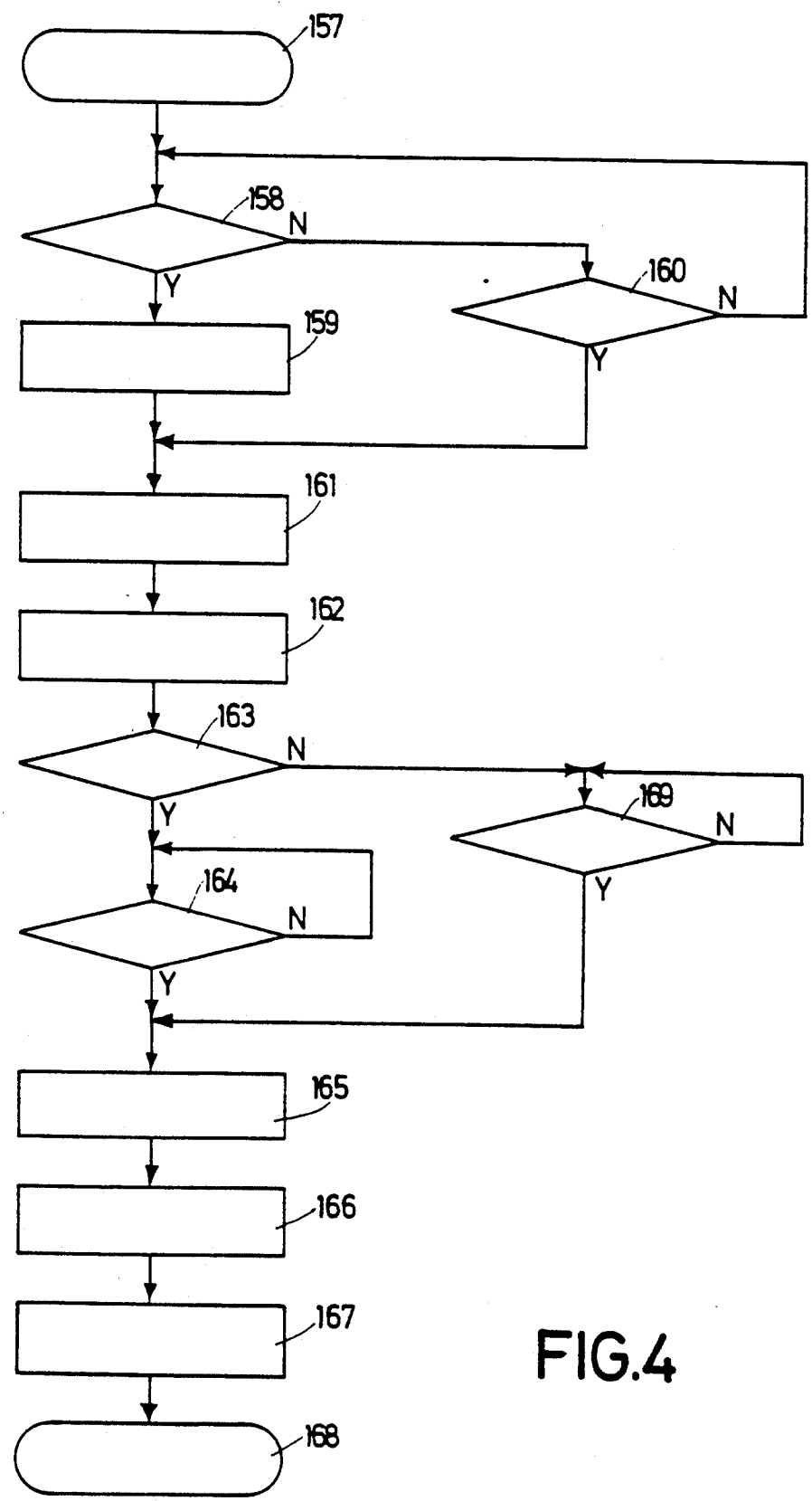
FIG. 4 is a flow chart of a program performed in the microcomputer of the apparatus shown in FIG. 1 in order to carry out a threading-in process by means of the tape-threading device.

A program executed in the microcomputer 132 of the apparatus 1 to carry out a thread-in process in order to move the tape-threading device 40 from its thread-out position to one of its thread-in positions will now be described with reference to the flow chart shown in FIG. 4.

The program is started in a block 157. In a block 158 it is subsequently ascertained whether the switch 141 has been closed, i.e. whether the button 142 for starting the "search" mode has been actuated. If it is found in the block 158 that the button 142 has been actuated a flag F is set in the block 159. If it is found in the block 158 that the button 142 has not been actuated the program proceeds to a block 160. In the block 160 it is ascertained whether the switch 143 has been closed, i.e. whether the button 114 for starting the mode "forward reproduction with normal tape speed" has been actuated. If the check in the block 160 yields a negative result the program proceeds to the block 158. However, if it is found in the block 160 that the button 144 has been actuated the program proceeds to a block 161, where the program also proceeds after the block 159.

In the block 161 a control signal R having a low level L is produced on the output of the microcomputer 132 for a time of approximately 100 ms. As a result of this control signal the motor is driven in the anti-clockwise direction for approximately 100 ms via the control circuit 152 in accordance with the first drive mode of the winding-mandrel driving device 98, so that the drive wheel 110 is driven clockwise and meshes with the second intermediate wheel 100. After said approximately 100 ms have elapsed the motor 99 stops, so that the winding-mandrel driving device 98 is reset to its stationary mode. In this way it is achieved that the second winding mandrel 96, which is in driving engagement with the second intermediate wheel 116, is locked against rotation during a subsequent thread-in process not only by the brake 121 but also by the winding-mandrel driving device 98 which has been switched to its stationary mode.

After the block 161 the program proceeds with a block 162 in which the control signal E is generated on the output 137 of the microcomputer 132, which signal is applied to the control circuit 147 for the threading motor 41 and causes the threading motor 41 to be driven in a direction of rotation in which it drives the command disc 45 anti-clockwise, as a result of which the first threading mechanism 48 and subsequently, if required, also the second threading mechanism are activated via the drive connections 46 and 47.

After the block 162 it is checked in a block 163 whether the flag F has been set, i.e. whether the button 142 has been actuated to start the "search" mode. If this check yields a positive result the program proceeds with a block 164. In the block 164 it is ascertained whether the microswitch 130, provided as a detector, has been closed. If this is not the case the program proceeds with the block 164. However, when it is found in the block 164 that the microswitch 130 has been closed the program proceeds to a block 165. The closed microswitch 130 indicates that the first threading mechanism 48 has reached its operating position, i.e. that the tape-threading device 40 occupies its first thread-in position. In the block 165 the program now proceeds to discontinue the supply of the control signal E on the output 137 of the microcomputer 132, so that the threading motor 41 is stopped and the tape-threading device 40 remains in its first thread-in position.

Subsequently, in a block 166 the control signal R with a high level H is produced on the output 139 of the microcomputer for a time interval of approximately 100 ms. As a result of this control signal R with a high level H the motor 99 is briefly driven clockwise in accordance with the second drive mode of the winding-mandrel driving device 98, causing the drive wheel 110 to be rotated in the anti-clockwise direction and thereby mesh with the first intermediate wheel 115, which is in mesh with the first winding-mandrel wheel 117. The brief activation of the second drive mode only serves to pivot the drive wheel 110 in order to bring it in driving engagement with the first winding-mandrel wheel 117. After said approximately 100 ms have elapsed the motor stops immediately because of the absence of the control signal R with a high level H, so that the winding-mandrel driving device 98 is then again in its stationary mode. In this stationary mode the first winding mandrel 95 is braked rapidly and reliably via the winding-mandrel driving device 98 owing to the friction and inertial conditions in this device, so that subsequently no magnetic tape 16 can be wound off the tape spool 17, which precludes looping of the tape as a result of this.

After the block 166 the program proceeds with a block 167, in which the flag F is reset. Subsequently, in a block 168 the current program sequence is terminated to proceed with other program sequences.

In the block 163 it is checked whether the flag F has been set, i.e. whether the button 142 for starting the "search" mode has been actuated. If this is the case, it is subsequently detected in the blocks 164 and 165 that the tape-threading device 40 has reached the first thread-in position necessary for such a search mode and after this first thread-in position has been reached the thread-in process is terminated. However, if in the block 163 it is found that the flag F has not been set the program proceeds with a block 169.

In the block 169 it is ascertained whether the microswitch 131, provided as the second detector, has been closed, i.e. whether the second threading mechanism 49 has reached its operating position and, consequently, the tape-threading device 40 occupies its second thread-in position required for the mode "forward reproduction at normal tape speed". As long as this is not the case the program proceeds with the block 169. If in the block 169 it is found that the microswitch 131 has been closed and, consequently, the tape-threading device 40 has reached its second thread-in position, the program subsequently proceeds with the block 165, in which, as already stated, the threading motor 41 is switched off again. Subsequently, in the block 166 the control signal R with a high level H is produced on the output 139 of the microcomputer 132, so that after the tape-threading device 40 has reached the second thread-in position the winding-mandrel driving device 98 is brought in operational engagement with the first winding mandrel 95 and, because the winding-mandrel driving device 98 is switched to its stationary mode after expiry of said approximately 100 ms, the first winding mandrel 95 is braked, which precludes running-out of the tape spool 17 and looping of the tape as a result thereof.

In order to reset the tape-threading device 40 from one of its thread-in positions to its thread-out position the microcomputer 132 produces the control signal A on its output 138, as a result of which the threading motor 41 is now driven in the direction of rotation in which the tape-threading device 40 is moved towards its thread-out position.

The invention is not limited to the exemplary embodiment described above. The invention can also be applied to other apparatuses comprising a differently constructed tape-threading device, a differently constructed winding-mandrel driving device and a differently constructed detection device. The invention can also be used in apparatuses constructed for recording and reproducing only audio signals. Moreover, the invention can also be used in apparatuses constructed only for reproducing video and audio signals.

I claim:

1. A magnetic tape apparatus for cooperating with a magnetic tape which extends between two adjacent rotatable reel hubs, said apparatus comprising:
   a) a pair of winding mandrels for receiving respective ones of said reel hubs;
   b) tape threading means moveable between a thread-out position, in which the tape threading means engages behind the tape which extends along an initial path, and a thread-in position, in which the tape extends along an operational path in the apparatus;
   c) first brake means for braking one of said winding mandrels receiving one of the reel hubs as the tape threading means is moved from said thread-out position to said thread-in position such that said tape is unwound from the other reel hub;
   d) detecting means for detecting whether said tape threading means has reached the thread-in position;
   e) winding mandrel driving means for selectively driving said winding mandrels; and
   f) second brake means comprising said driving means being brought into braking engagement with said other winding mandrel for braking the other reel hub in response to said detecting means having detected said tape threading means having reached the thread-in position,
   said other winding mandrel and other reel hub being free of braking action as the tape is unwound therefrom during movement of the threading means from the thread-out position to the thread-in position.

2. A magnetic tape apparatus according to claim 1, wherein said winding mandrel driving means comprises a drive wheel selectively moveable into engagement with said winding mandrels and a motor for rotatably driving said drive wheel, said driving means having an operating mode in which said motor drives said drive wheel and a stationary mode in which said motor does not drive said drive wheel, and during braking of said other winding mandrel, said driving means being in said stationary mode and said other winding mandrel driving said drive wheel and said motor.

3. A magnetic tape apparatus according to claim 2, wherein said drive wheel is pivotable into engagement with said winding mandrels, and said apparatus comprises means for briefly energizing said motor for pivoting said drive wheel into engagement with said other driving mandrel.

4. A magnetic tape apparatus according to claim 3, wherein said driving means further comprises a winding mandrel wheel coaxially fixed to each of said winding mandrels and a respective intermediate wheel between said drive wheel and each of said winding mandrel wheels, and said drive wheel engages said winding mandrels via said winding mandrel wheels and said intermediate wheels.

* * * * *

UNITED STATES PATENT AND TRADEMARK OFFICE
CERTIFICATE OF CORRECTION

PATENT NO. : 5,330,129
DATED : July 19, 1994
INVENTOR(S) : Josef Inschlag

It is certified that error appears in the above-indentified patent and that said Letters Patent is hereby corrected as shown below:

On the title page, item [75] inventor, change "Australia" to --Austria--.

Signed and Sealed this

Seventh Day of February, 1995

Attest:

BRUCE LEHMAN

Attesting Officer     Commissioner of Patents and Trademarks